(12) United States Patent
Hikai

(10) Patent No.: US 7,665,260 B2
(45) Date of Patent: Feb. 23, 2010

(54) FASTENING MEMBER, SIDING BOARDS ATTACHMENT STRUCTURE USING THE SAME AND METHOD OF ATTACHING SIDING BOARDS

(75) Inventor: Satoshi Hikai, Nagoya (JP)

(73) Assignee: Nichiha Co., Ltd., Nagoya-shi (JP)

( * ) Notice: Subject to any disclaimer, the term of this patent is extended or adjusted under 35 U.S.C. 154(b) by 686 days.

(21) Appl. No.: 11/180,706

(22) Filed: Jul. 14, 2005

(65) Prior Publication Data
US 2006/0032173 A1 Feb. 16, 2006

(30) Foreign Application Priority Data
Jul. 28, 2004 (JP) ............... 2004-220493

(51) Int. Cl.
*F27D 1/00* (2006.01)
(52) U.S. Cl. .......... 52/506.05; 52/235; 52/547; 52/715; 52/543; 403/381
(58) Field of Classification Search .......... 52/715, 52/543, 546, 547, 489.1, 506.06, 506.09, 52/235; 403/381
See application file for complete search history.

(56) References Cited
U.S. PATENT DOCUMENTS
5,797,232 A * 8/1998 Larson .................. 52/408
6,170,214 B1 * 1/2001 Treister et al. ........... 52/511
6,315,489 B1 * 11/2001 Watanabe ................. 403/381
6,460,311 B1 10/2002 Ito
6,499,261 B2 * 12/2002 Hikai ...................... 52/235
6,598,362 B2 * 7/2003 Hikai ...................... 52/235
6,609,342 B2 * 8/2003 Hikai ...................... 52/506.01
6,843,032 B2 * 1/2005 Hikai ...................... 52/287.1

FOREIGN PATENT DOCUMENTS
JP 2000-291225 10/2000
JP 2004-332450 11/2004

* cited by examiner

Primary Examiner—Richard E Chilcot, Jr.
Assistant Examiner—Chi Q Nguyen
(74) Attorney, Agent, or Firm—Oblon, Spivak, McClelland, Maier & Neustadt, L.L.P.

(57) ABSTRACT

The present invention provides a fastening member which can fasten siding boards in which a lateral joint portion is arranged in a portion where a vertical member is not arranged with a sufficient strength, can prevent a displacement, and is excellent in a durability. Another object is to provide a siding boards attachment structure using the fastening member. Further another object is to provide a method of attaching siding boards using the fastening member. The fastening member has a long fixing plate portion. The long fixing plate portion is provided with a first fastening portion for engaging upper and lower end portions in the lateral joint portion of the siding boards, a vertical rising portion in a lower side of the first fastening portion, and a second fastening portion for engaging upper and lower end portions of the siding board in the other portions than the lateral joint portion.

10 Claims, 20 Drawing Sheets

US 7,665,260 B2

FASTENING MEMBER, SIDING BOARDS ATTACHMENT STRUCTURE USING THE SAME AND METHOD OF ATTACHING SIDING BOARDS

CROSS-REFERENCES TO RELATED APPLICATIONS

The present application claims priority under 35 U.S.C. §119 to Japanese Patent Application No. 2004-220493, filed Jul. 28, 2004, entitled "FASTENING MEMBER, SIDING BOARDS ATTACHMENT STRUCTURE USING THE SAME AND METHOD OF ATTACHING SIDING BOARDS". The contents of this application are incorporated herein by reference in their entirety.

BACKGROUND OF THE INVENTION

1. Field of the Invention

The present invention relates to a fastening member for horizontal boarding, a siding boards attachment structure using the same, and a method of attaching siding boards.

2. Discussion of the Background

In related art, conventionally, a furring strip backing set is assembled as a module of 455 mm. In particular, a span between a post and a stud is set to 455 mm. This is a module which is much employed in a Japanese house building field.

In accordance with this, a product size of a siding board is designed and manufactured in correspondence to the module of the furring strip backing set mentioned above so as to satisfy a horizontal width which is an integral multiple of 455 mm (for example, 455 mm×4 =1820 mm).

However, in recent years, there are many cases that a design in which the span between the post and the stud is different from the module 455 mm, for example, 500 mm serving as a meter module, 24 inch (610 mm) or the like is employed. In such the case mentioned above, if the siding board for a module of 455 mm is fixed to the post and the stud mentioned above, the right and left end portions of the siding board can not arranged on the post and the stud. Since these portions are not supported by a framework, there is a risk that it is impossible to sufficiently secure a fixing force of the siding board with respect to the framework.

Accordingly, as shown in FIG. 20, there has been proposed a technique of fastening siding boards to a framework 2 by using a long fastening fitting 9 fixed over an adjacent vertical member (post or stud) 21, as shown in FIG. 20 (refer to patent document 1 and 2).

The long fastening fitting 9 has a flat substrates 91 constituting an attaching surface to the vertical member 21 mentioned above, a flat plate portion 92 protruding to a front side than the flat substrates 91, a upright portion 93 protruded forward perpendicular to the flat plate portion 92 over an entire horizontal width direction of the flat plate portion 92, and an upper board engaging portion 94 and a lower board engaging portion 95 which respectively formed upward and downward from a front end of the upright portion 93, as shown in FIG. 20.

Further, the long fastening fitting 9 is arranged in an upper side portion and a lower side portion of a lateral joint portion of the adjacent siding boards, two siding boards in the lower side are engaged by the lower board engaging portion 95, and the upper side siding board is engaged by the upper board engaging portion 94.

In this case, as shown in FIG. 20, the long fastening fitting 9 is fixed to the vertical member 21 via a furring strip 23.

However, the long fastening fitting 9 is manufactured in accordance with an aluminum extrusion molding or the like, and the upper board engaging portion 94 and the lower board engaging portion 95 are integrally formed in a long size. Accordingly, a rigidity is lack, and an excessive force is applied to the long fastening fitting 9 in the case that a great wind pressure is applied to two left and right siding boards to which the upper board engaging portion 94 or the lower board engaging portion 95 is engaged. As a result, there can be considered that a metal fatigue is accumulated in the long fastening fitting 9 due to a long-time use, and there is a risk that it is hard to secure a stable fastening strength of the siding board over a long period.

Further, since the long fastening fitting 9 engages the upper side portion and the lower side portion of the siding board, however, does not particularly have a function of preventing the siding board from moving to the right and left, there is a risk that it becomes hard to sufficiently prevent the siding board from being shifted to the right and left on the basis of an expanding and contracting operation or the like.

Patent Document 1: JP 2000-291225 Unexamined Patent Publication (Kokai)

Patent Document 2: U.S. Pat. No. 6,460,311

SUMMARY OF THE INVENTION

The present invention is made by taking the conventional problems mentioned above into consideration, and an object of the present invention is to provide a fastening member using for horizontal boarding and enabling siding boards formed for a set module to be fixed for a furring strip backing set assembled as a different module. The fastening member can fasten a siding board in which a lateral joint portion is arranged in a portion where a vertical member is not arranged with a sufficient strength, can prevent a displacement in right and left sides, and is excellent in a durability. Another object of the present invention is to provide a siding boards attachment structure using the fastening member. Further another object of the present invention is to provide a method of attaching siding boards using the fastening member.

According to a first aspect of the present invention, there is provided a fastening member for fastening siding boards in which a lateral joint portion is arranged in a portion where a vertical member of a framework of a building is not arranged in to the framework.

The fastening member has a long fixing plate portion configured to be fixed to at least one vertical member.

A front surface of the long fixing plate portion is provided with a first fastening portion, a vertical rising portion arranged in a lower side of the first fastening portion, a second fastening portion.

The first fastening portion engages an upper end portion in the lateral joint portion of the siding boards and arranged in a lower side thereof, and supports and engages a lower end portion of the siding boards and arranged in an upper side.

The second fastening portion engages the upper end portion of the siding board in the other portions than the lateral joint portion, and supports and engages the lower end portion of the siding board arranged in an upper side thereof.

A description is given next of an operation and effect of the present invention.

The fastening member mentioned above has a long fixing plate portion fixed to at least one vertical member, and is structured such that the first fastening portion is arranged in the long fixing plate portion. Accordingly, it is possible to securely fix the long fixing plate portion to the vertical member in a state in which the first fastening portion is arranged in the lateral joint portion of the siding boards.

Accordingly, even in the case that the lateral joint portion is arranged in the portion in which the vertical member is not arranged, the long fixing plate portion of the fastening member is securely fixed to the vertical member, whereby it is possible to fasten the siding board to the framework with a sufficient strength.

Further, since it is possible to fix the long fixing plate portion to any vertical member regardless of a position of the lateral joint portion at a time of arranging the first fastening portion in the lateral joint portion, it is easy to construct.

Further, since the siding board is engaged in the lateral joint portion by the first fastening portion, and the first fastening portion is not long, it is possible to resist by a rigidity of an entire of the fastening member even if a great force is applied on the basis of the wind pressure. Accordingly, it is possible to obtain the fastening member which is excellent in the durability.

Further, since the fastening member has the second fastening portion, it is possible to securely fasten the lateral external wall horizontally by engaging the second fastening portion to the siding board together with the first fastening portion.

Further, the fastening member has the vertical rising portion. Accordingly, even in the case that the lateral joint portion is arranged in the portion in which the vertical member is not arranged, it is possible to fix the fastening member to the framework in a state in which the vertical rising portion is abutted on a side end surface of the siding board, so that it is possible to prevent the siding board from being shifted to the right and left sides.

As mentioned above, in accordance with the present invention, it is possible to provide the fastening member which can prevent the displacement in the right and left sides as well as it is possible to fasten the siding board in which the lateral joint portion is arranged in the portion where the vertical member is not arranged, and is excellent in the durability.

According to a second aspect of the present invention, there is provided a siding boards attachment structure in which a lateral joint portion of siding boards is arranged in a portion where a vertical member is not arranged in a framework of a building.

Wherein the siding board is fastened to the structure building body by fastening members each of which has a long fixing plate portion and a first fastening portion, a vertical rising portion and a second fastening portion respectively formed in a front surface of the long fixing plate portion.

The long fixing plate portion is fixed to at least one of the vertical members.

The first fastening portion engages an upper end portion in the lateral joint portion of the siding boards and supports and engages a lower end portion of the siding board above the upper end portion.

The vertical rising portion abuts on a side end surface of the siding board in the lateral joint portion.

The second fastening portion engages an upper end portion of the siding board in the other portions than the lateral joint portion so as to support and engage a lower end portion of the siding board.

A description is given next of an operation and effect of the present invention.

In the siding boards attachment structure, the siding board is fastened to the framework by the fastening member configured such that the first fastening portion is arranged in the long fixing plate portion. Accordingly, it is possible to fix the long fixing plate portion to the vertical member in a state in which the first fastening portion is arranged in the lateral joint portion of the siding boards.

Accordingly, even in the case that the lateral joint portion is arranged in the portion in which the vertical member is not arranged, it is possible to secure a fastening strength of the siding board.

Further, since it is possible to fix the long fixing plate portion to any vertical member regardless of a position of the lateral joint portion at a time of arranging the first fastening portion in the lateral joint portion, it is easy to construct.

Further, since the first fastening portion engaging the siding board in the lateral joint portion is not long, it is possible to secure the rigidity of the fastening member as mentioned above, and it is possible to secure the durability of the siding boards attachment structure by extension.

Further, since the fastening member has the second fastening portion, it is possible to securely fasten the lateral external wall horizontally.

Further, since the fastening member has the vertical rising portion, it is possible to prevent the siding board from being shifted to the right and left sides, even in the case that the lateral joint portion is arranged in the portion in which the vertical member is not arranged.

As mentioned above, in accordance with the present invention, it is possible to provide the siding boards attachment structure which can prevent the displacement in the right and left sides as well as it is possible to fasten the siding board in which the lateral joint portion is arranged in the portion where the vertical member is not arranged, and is excellent in the durability.

According to a third aspect of the present invention, there is provided a method of constructing a siding boards attachment structure in which a lateral joint portion of siding boards is arranged in a portion where a vertical member of a framework of a building is not arranged in. The method has following steps.

The first step is preparing a fastening member having a long fixing plate portion of a length equal to or more than an arrangement span of the vertical members.

A front surface of the long fixing plate portion is provided with a first fastening portion, a vertical rising portion arranged in a lower side of the first fastening portion, a second fastening portion and a third fastening portion.

The second step is arranging and fixing the fastening member to the framework so as to abut the vertical rising portion on a side end surface of the siding board in the lateral joint portion of the siding boards arranged in a lower side, engage the first fastening portion to an upper end portion of the siding board, and engage the second fastening portion to an upper end portion of the siding board, in the other portions than the lateral joint portion.

The third step is arranging the siding board in the upper side so as to support and engage the lower end portion of the siding board to the first fastening portion and the second fastening portion.

Next, a description is given of an operation and effect of the present invention.

In the external wall constructing method, the siding board is fastened to the framework by the fastening member configured such that the first fastening portion is arranged in the long fixing plate portion having the length equal to or more than the arrangement span of the vertical member. Accordingly, it is possible to fix the long fixing plate portion to the vertical member in a state in which the first fastening portion is arranged in the lateral joint portion of the siding boards.

Accordingly, even in the case that the lateral joint portion is arranged in the portion in which the vertical member is not arranged, it is possible to fix the siding board with a sufficient fastening strength.

Further, since it is possible to fix the long fixing plate portion to any vertical member regardless of a position of the lateral joint portion at a time of arranging the first fastening portion in the lateral joint portion, it is easy to construct.

Further, since the first fastening portion engaging the siding board in the lateral joint portion is not long, it is possible to secure the rigidity of the fastening member as mentioned above, and it is possible to secure the durability of the siding boards attachment structure by extension.

Further, since the fastening member has the second fastening portion, it is possible to securely fasten the lateral external wall horizontally.

Further, since the fastening member has the vertical rising portion, it is possible to prevent the siding board from being shifted to the right and left sides, even in the case that the lateral joint portion is arranged in the portion in which the vertical member is not arranged.

As mentioned above, in accordance with the present invention, it is possible to provide the method of attaching siding boards for constructing the siding boards attachment structure which can prevent the displacement in the right and left sides as well as it is possible to fasten the siding board in which the lateral joint portion is arranged in the portion where the vertical member is not arranged, and is excellent in the durability.

BRIEF DESCRIPTION OF THE DRAWINGS

A more complete appreciation of the invention and many of the attendant advantages thereof will become readily apparent with reference to the following detailed description, particularly when considered in conjunction with the companying drawings, in which.

DESCRIPTION OF THE PREFERRED EMBODIMENTS

Figure 1:
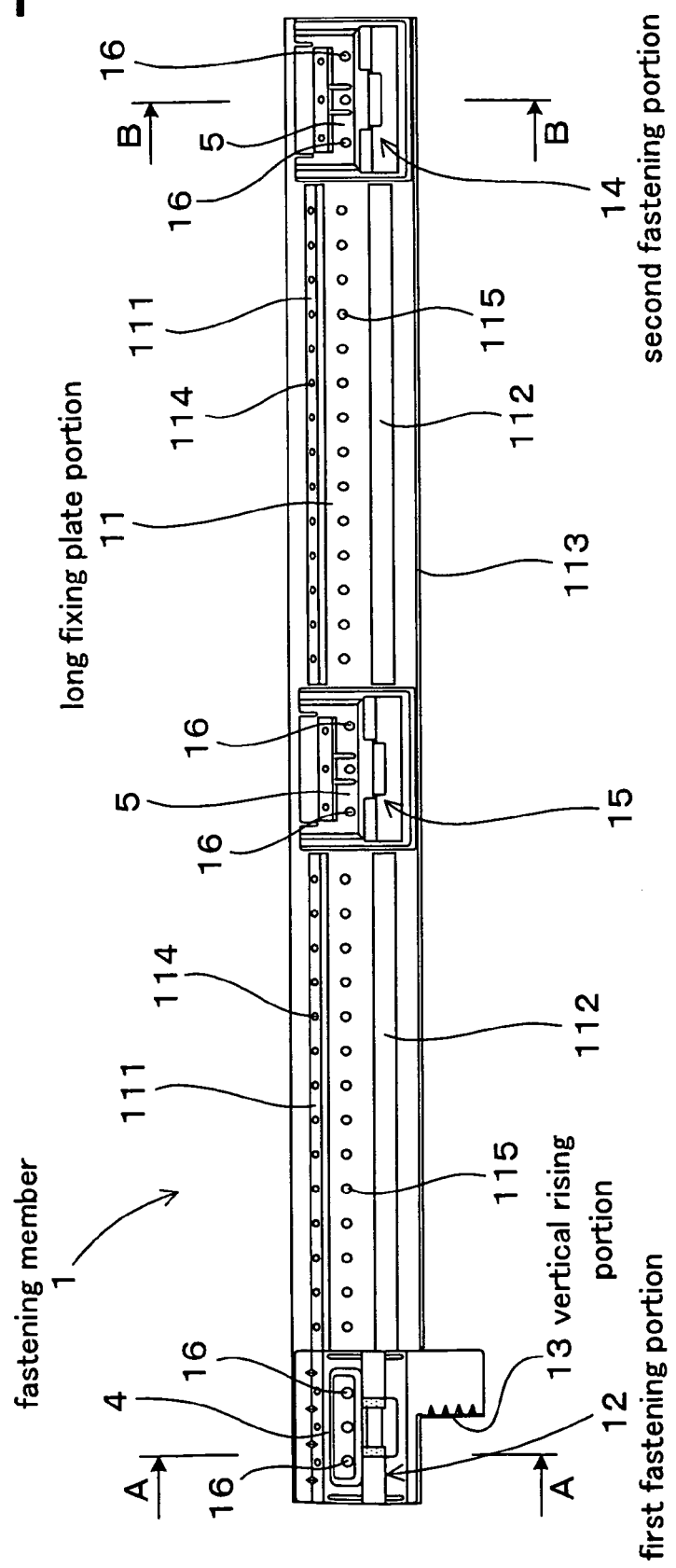
FIG. 1 is a front elevational view of a fastening member in accordance with an embodiment 1.

In the first aspect of the present invention, the framework is constituted, for example, by a wooden framework, and can be constituted by various framework such as a framework of an axial framing construction structure, a framework of a frame construction structure, and the like.

Further, the fastening member may be directly fixed to the vertical member, or may be indirectly fixed to the vertical member via an underlayment such as a furring strip or the like.

Further, the fastening member can be formed, for example, by a hot melted zinc-aluminum-magnesium alloy coated steel plate, a stainless steel plate, a steel plate or the like.

Further, the siding board can be formed, for example, as a ceramic type siding board.

Further, it is preferable that the long fixing plate portion has a lateral length between 500 and 1000 mm.

Further, in the present specification, "front" means an outer direction of a building and "rear" means an inner direction of the building. Further, with regard to the fastening member mentioned above, there are employed expressions such as "front", "rear", "upper", "lower", "horizontal", "vertical" and the like, in a state of being attached to a framework. Further, with regard to "left" and "right", they show directions "left" and "right" in the case of front viewing an external wall from a design surface side (refer to FIGS. 10 and 11).

Further, it is preferable that the first fastening portion is provided in one end portion of the long fixing plate portion, and the second fastening portion is provided in the other end portion of the long fixing plate portion.

In this case, it is possible to arrange the fastening member in an upper end portion and a lower end portion of the siding board in a more stable state.

Further, it is preferable that the fastening member further has a third fastening portion including the same shape and function as those of the second fastening portion.

In this case, it is possible to improve a fastening strength of the siding board more.

Further, the fastening member may be formed by fixing a fastening fitting with a stopper in which the first fastening portion and the vertical rising portion are integrally formed, to a front surface of the long fixing plate portion.

In this case, it is possible to easily obtain the fastening member by fixing the fastening fitting with the stopper which is independently prepared, to the long fixing plate portion. Further, in the case that the lateral joint portion of the siding boards is arranged at a position of the vertical member, it is possible to directly fix the fastening fitting with the stopper to the framework independently.

In this case, when fixing the fastening fitting with the stopper to the long fixing plate portion, it is possible to apply, for example, a burring process.

Further, the fastening member may be formed by fixing a fastening fitting forming the second fastening portion, to a front surface of the long fixing plate portion.

In this case, it is possible to easily obtain the fastening member by fixing the independently prepared fastening fitting to the long fixing plate portion. Further, it is possible to independently fix the fastening fitting to the framework as it is, in the portion in which the fastening member is not arranged.

In this case, when fixing the fastening fitting to the long fixing plate portion, it is possible to apply, for example, the burring process.

Further, the second fastening portion may be integrally formed with the long fixing plate portion by processing a part of the long fixing plate portion.

In this case, it is possible to intend a weight saving and a cost reduction of the fastening member.

Further, it is preferable that the long fixing plate portion is formed by forming a rib portion protruding to a front side in a lateral direction, and is formed by forming a lower side bent portion bent to a front side from a lower side of the long fixing plate portion.

In this case, it is possible to secure a strength of the long fixing plate portion. Further, in the case of fixing the fastening fitting to the long fixing plate portion, it is possible to easily position in a vertical direction for attaching, by abutting the lower end of the fastening fitting on the lower side bent portion.

In the second aspect of the present invention, it is preferable that the fastening member further has a third fastening portion having the same shape and function as those of the second fastening portion, and the third fastening portion engages an upper end portion of the siding board in the other portions than the lateral joint portion, and supports and engages a lower end portion.

In this case, it is possible to improve a fastening strength of the siding board more, and it is possible to obtain the siding boards attachment structure which is excellent in a durability.

Further, it is preferable that the framework sets an arrangement span of the vertical member between 500 and 610 mm, and the long fixing plate portion has a lateral length between 540 and 650 mm.

In this case, it is possible to easily fix the fastening member to at least one vertical member.

Embodiment 1

A description is given of a fastening member in accordance with an embodiment of the present invention with reference to FIGS. 1 to 13.

Figure 10:
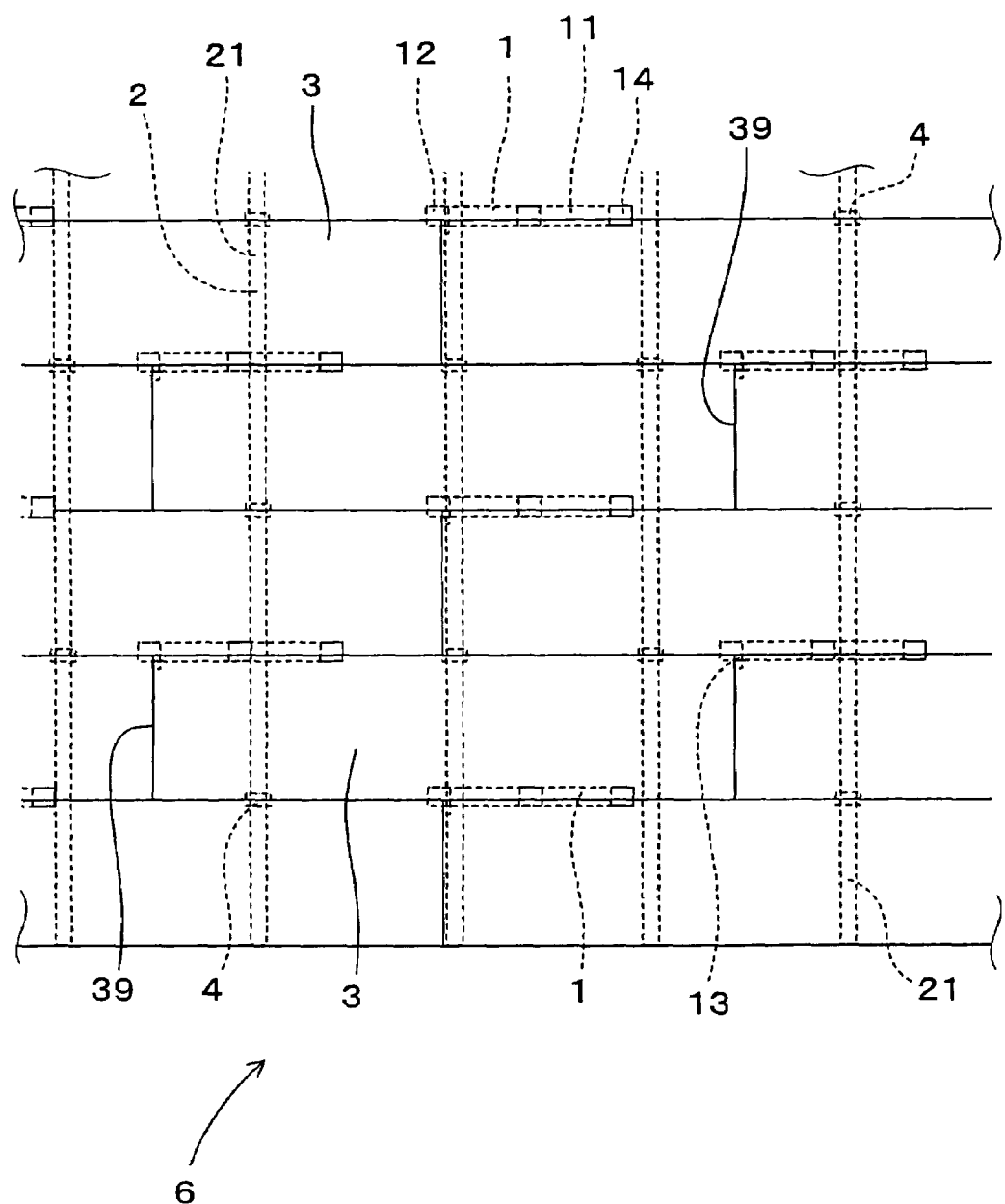
FIG. 10 is a front elevational view of a siding boards attachment structure using the fastening member in accordance with the embodiment 1.

A fastening member 1 in accordance with the present embodiment is a member for fastening a siding board 3 in which a lateral joint portion 39 is arranged in a portion where a vertical member 21 is not arranged in a framework 2 of a building, to the framework 2, as shown in FIG. 10.

The fastening member 1 has a long fixing plate portion 11 configured to be fixed to at least one vertical member 21, as shown in FIGS. 1 and 10.

Figure 2:
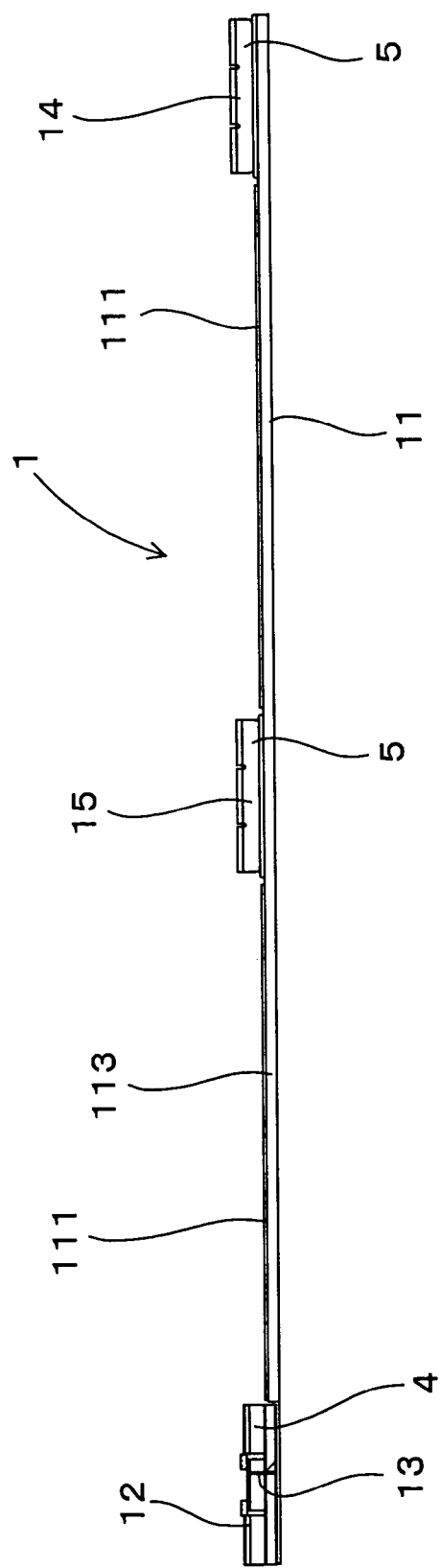
FIG. 2 is a base elevational view of the fastening member in accordance with the embodiment 1.

As shown in FIGS. 1 and 2, a front surface of the long fixing plate portion 11 is provided with a first fastening portion 12, a vertical rising portion 13 arranged in a lower side of the first fastening portion 12, a second fastening portion 14 and a third fastening portion 15.

Figure 11:
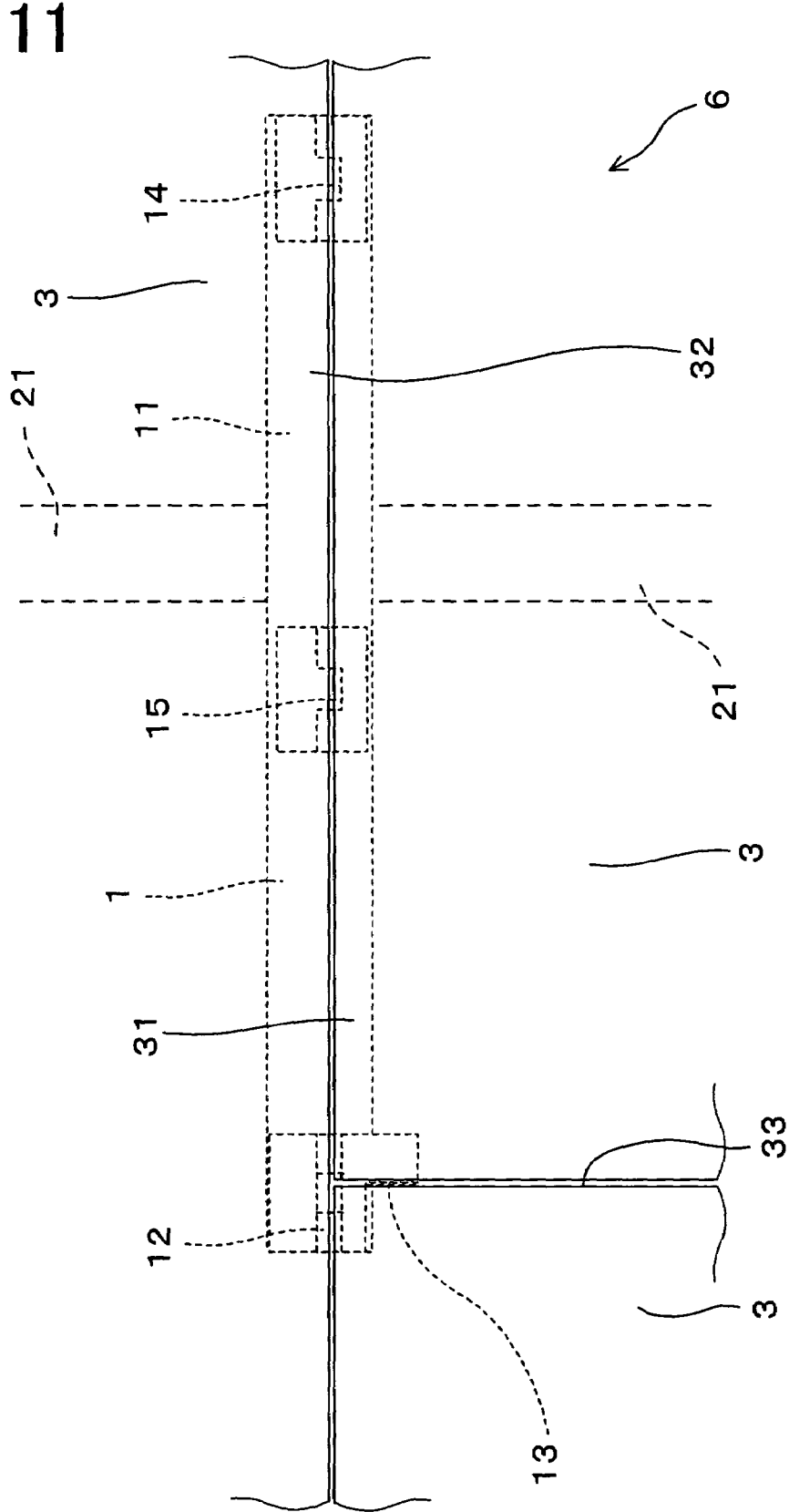
FIG. 11 is a partial enlarged front elevational view of the siding boards attachment structure in the periphery of the fastening member in accordance with the embodiment 1.
Figure 12:
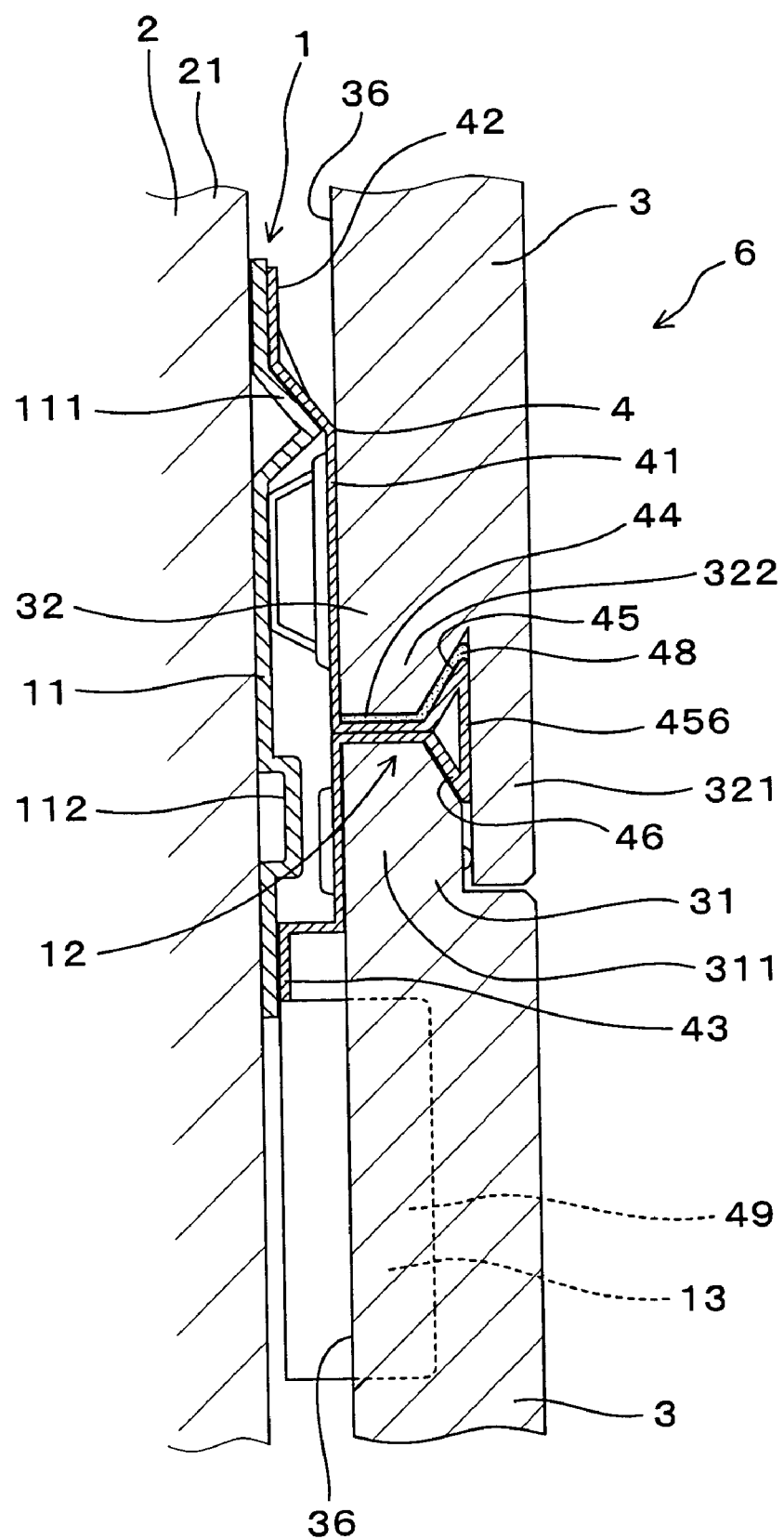
FIG. 12 is a cross sectional view of the siding boards attachment structure corresponding to a cross section as seen from an arrow along a line A-A in FIG. 1, in accordance with the embodiment 1.

As shown in FIGS. 11 and 12, the first fastening portion 12 engages an upper end portion 31 in the lateral joint portion 39 of the siding boards 3 and 3 arranged in a lower side thereof, and supports and engages a lower end portion 32 of the siding boards 3 and 3 arranged in an upper side.

The vertical rising portion 13 is abutted on a right end portion (a side end surface 33) of the siding board 3 arranged in a left side, in a lower side of the first fastening portion 12.

Figure 13:
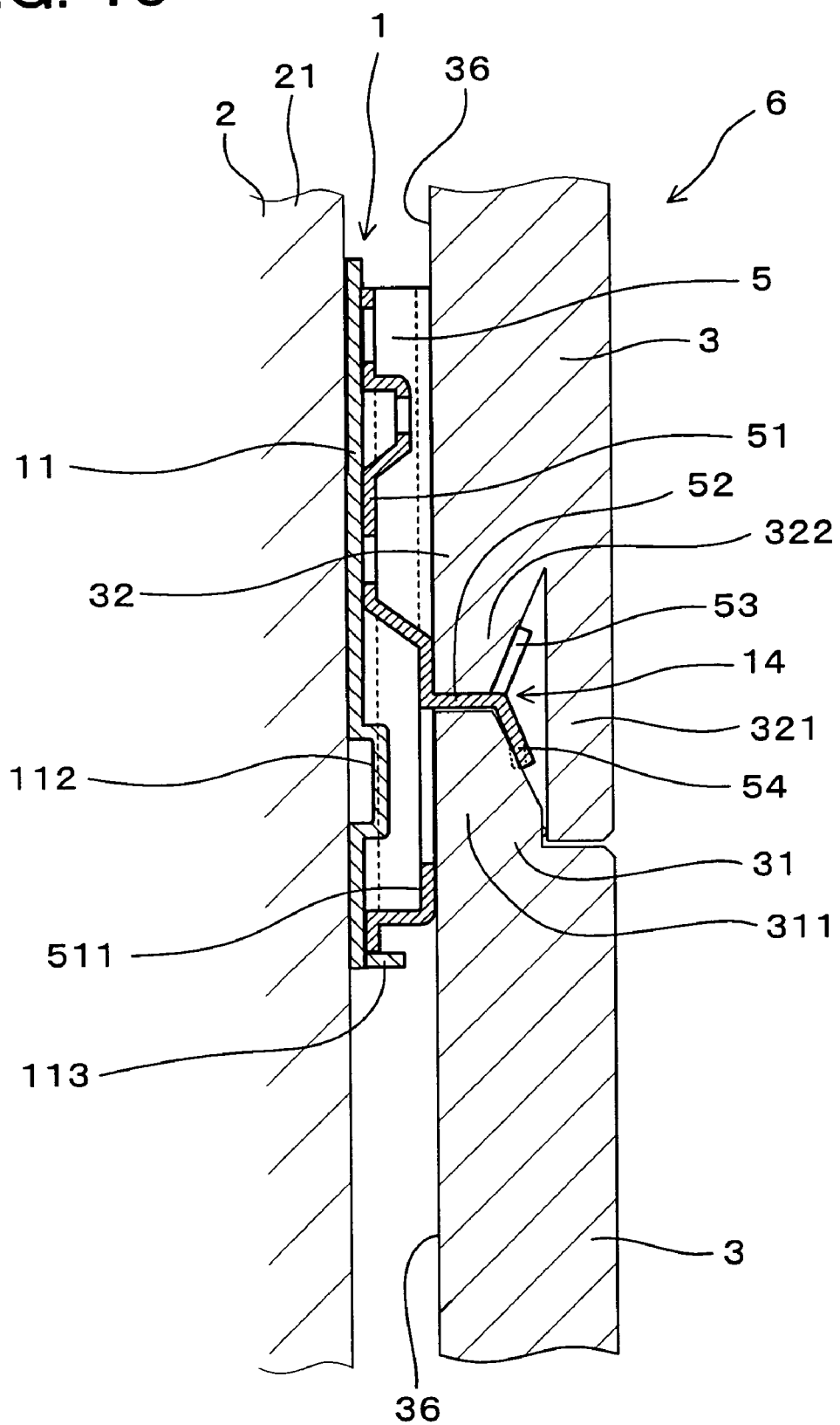
FIG. 13 is a cross sectional view of the siding boards attachment structure corresponding to a cross section as seen from an arrow along a line B-B in FIG. 1, in accordance with the embodiment 1.
Figure 14:
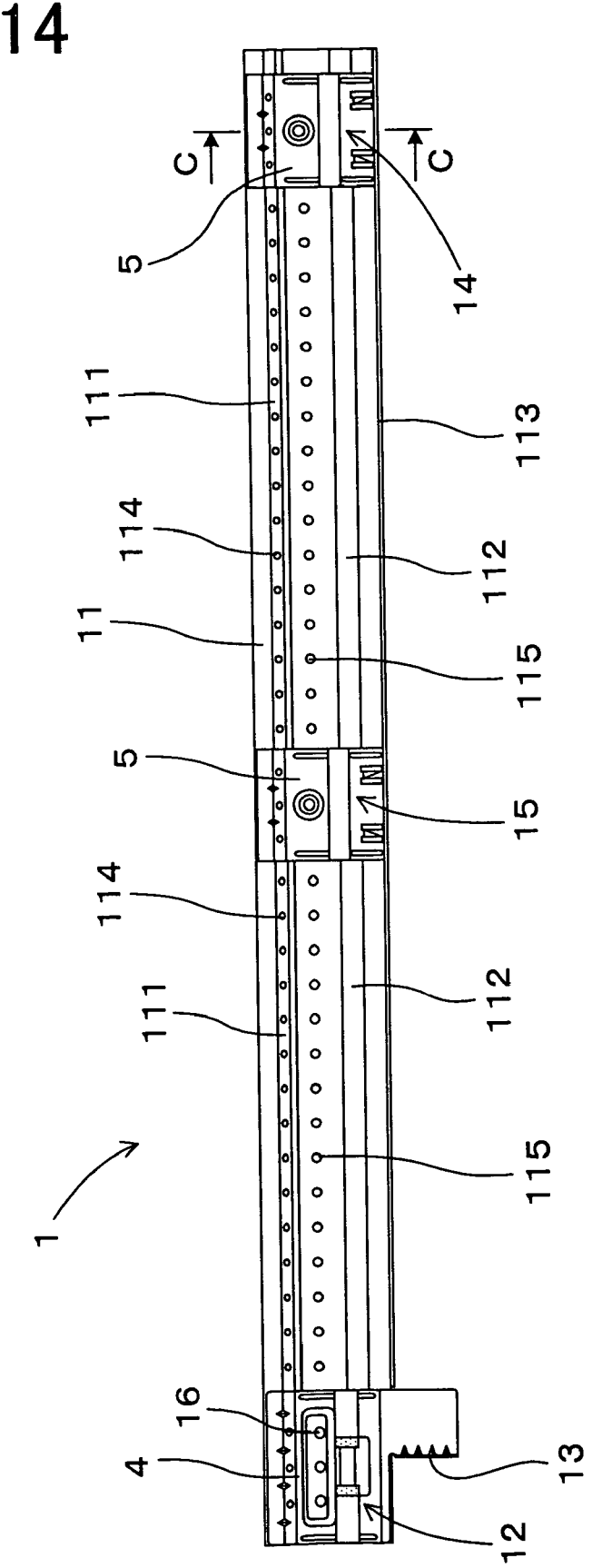
FIG. 14 is a front elevational view of a fastening member in accordance with an embodiment 2.

As shown in FIGS. 11 and 13, the second fastening portion 14 engages the upper end portion 31 of the siding board 3 in the other portions than the lateral joint portion 39, and supports and engages the lower end portion 32 of the siding board 3 arranged in an upper side thereof.

As shown in FIG. 1, the first fastening portion 12 is provided in a left end portion of the long fixing plate portion 11, and the second fastening portion 14 is provided in a right end portion of the long fixing plate portion 11.

Further, the fastening member 1 has the third fastening portion 15 including the same shape and function as those of the second fastening portion 14. The third fastening portion 15 is arranged in an approximately center portion of the long fixing plate portion 11.

The fastening member 1 is structured by fixing a fastening fitting with a stopper 4 formed by integrally forming the first fastening portion 12 and the vertical rising portion 13, a fastening fitting 5 in which the second fastening portion 14 is formed, and a fastening fitting 5 in which the third fastening portion 15 is formed, respectively to a front surface of the long fixing plate portion 11.

The fastening fitting with a stopper 4 and the fastening fitting 5 are caulked and fixed to the long fixing plate portion 11 in a caulking portion 16 shown in FIG. 1.

Figure 9:
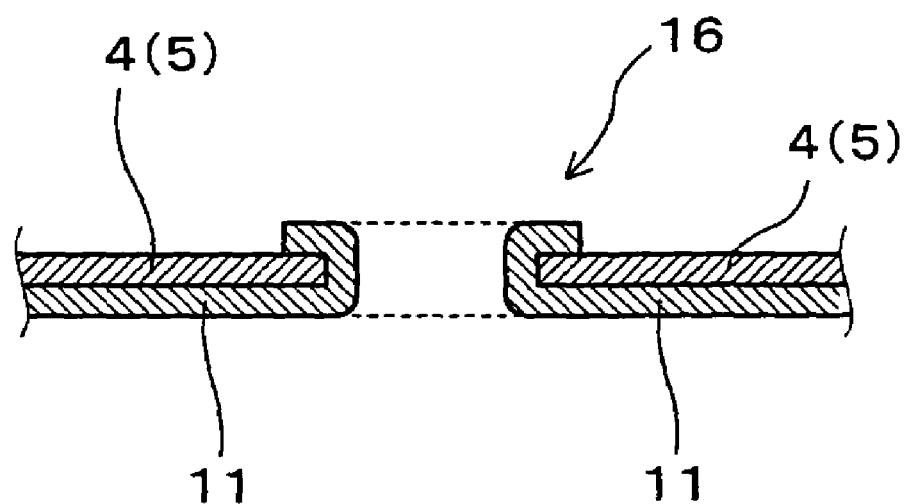
FIG. 9 is an explanatory view of a burring process in accordance with the embodiment 1.

In other words, as shown in FIG. 9, a buffing process is applied to two or more positions between the long fixing plate portion 11 and the fastening fitting with a stopper 4 or the fastening fitting 5. When applying the buffing process, first, an opening portion of the long fixing plate portion 11 is lapped over an opening portion of the fastening fitting with a stopper 4 and the fastening fitting 5. Next, a peripheral portion of the opening portion of the long fixing plate portion 11 is protruded to a front side rather than the opening portion of the fastening fitting with a stopper 4 or the fastening fitting 5, and a protruding portion from the opening portion is bent and crimped in a front surface in such a manner as to pinch the fastening fitting with a stopper 4 or the fastening fitting 5.

Figure 3:
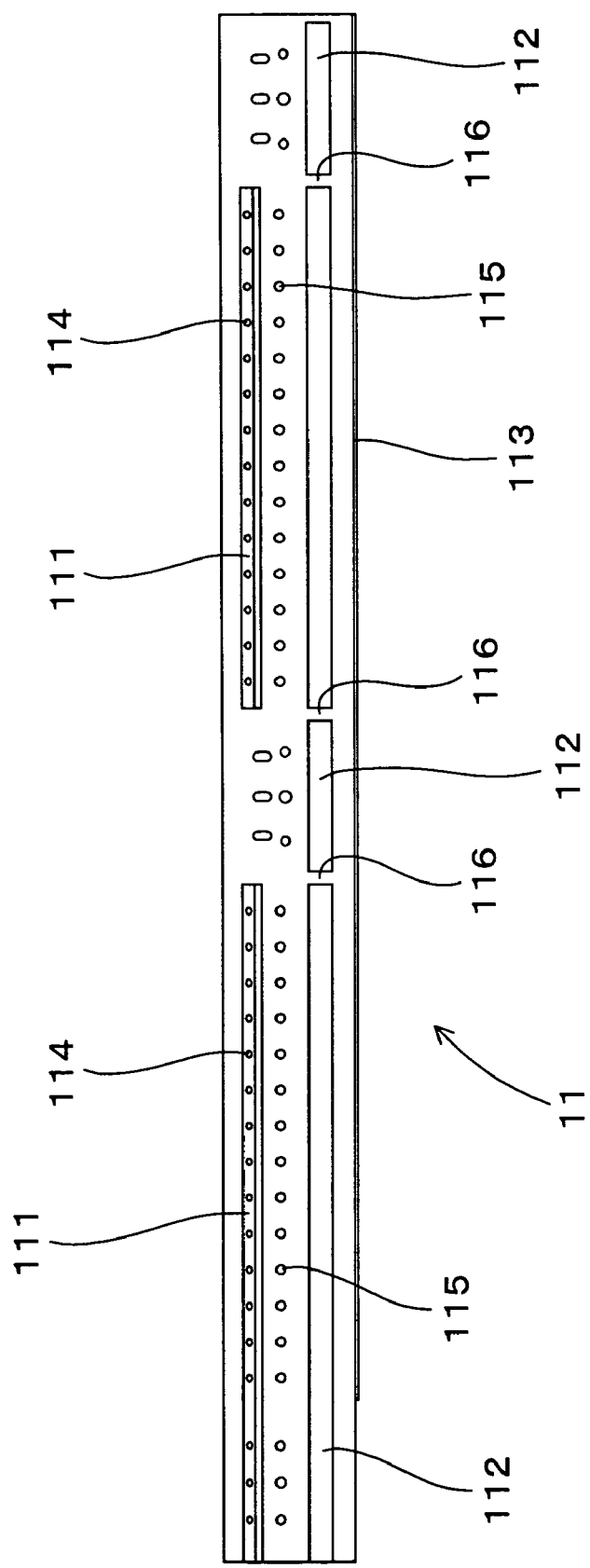
FIG. 3 is a front elevational view of a long fixing plate portion of the fastening member in accordance with the embodiment 1.
Figure 4:
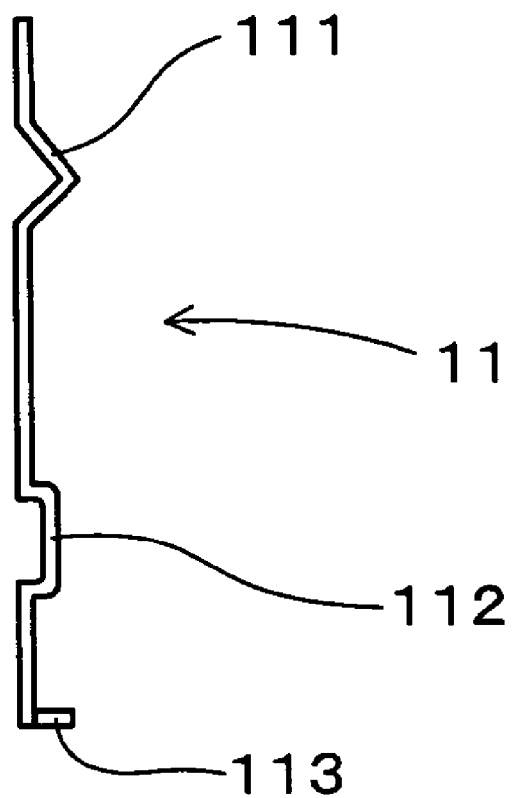
FIG. 4 is a left side elevational view of the long fixing plate portion in accordance with the embodiment 1.

As shown in FIGS. 3 and 4, the long fixing plate portion 11 is structured such that a plurality of upper side rib portions 111 and lower side rib portions 112 protruding to a front side are formed in a lateral direction, and a lower side bent portion 113 bent perpendicularly to a front side from a lower side of the long fixing plate portion 11 is formed.

Further, the long fixing plate portion 11 has a lateral length of 650 mm. The length can correspond to a module of 500 mm or 610 mm.

In a portion in which the fastening fitting 5 is arranged in the long fixing plate portion 11, the rib portion 111 is not formed, and a break portion 116 in which the rib portion 112 is interrupted exists. Accordingly, the fastening fitting 5 is mounted on the long fixing plate portion 11 in a contact state.

Further, the upper rib portion 111 protrudes in an approximately triangular cross sectional shape, and a lot of nail holes 114 are formed in an upper slope surface at a uniform interval (for example, at 15 mm) in a lateral direction.

Further, a plurality of screw holes 115 are formed between the rib portion 111 and the rib portion 112 at a uniform interval (for example, at 15 mm) in a lateral direction. Accordingly, it is possible to securely screw the fastening member 1 to a post or a stud portion with which the long fixing plate portion 11 is abutted on.

Further, the lower side bent portion 113 is continuously formed in the other portion than a portion close to a left end in the long fixing plate portion 11 which the fastening fitting with a stopper 4 is arranged. A lower end portion abuts on such that the fastening fitting 5 is mounted on the lower side bent portion 113.

Figure 5:
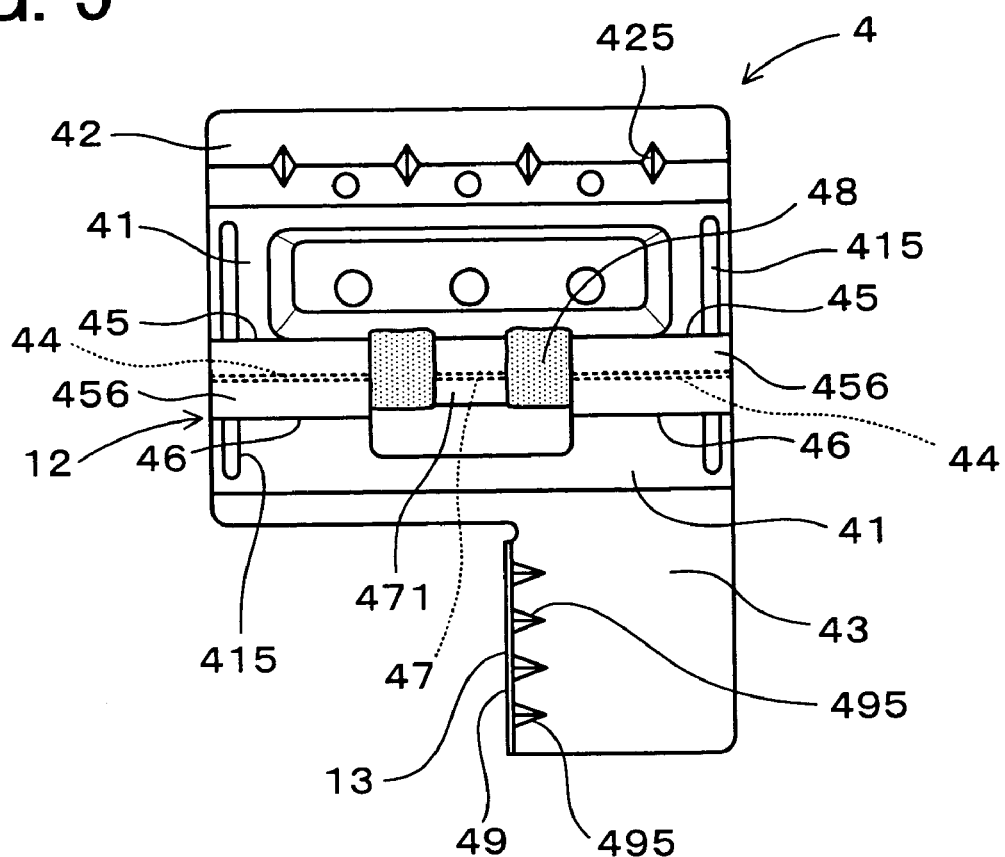
FIG. 5 is a front elevational view of a fastening fitting with a stopper in accordance with the embodiment 1.
Figure 6:
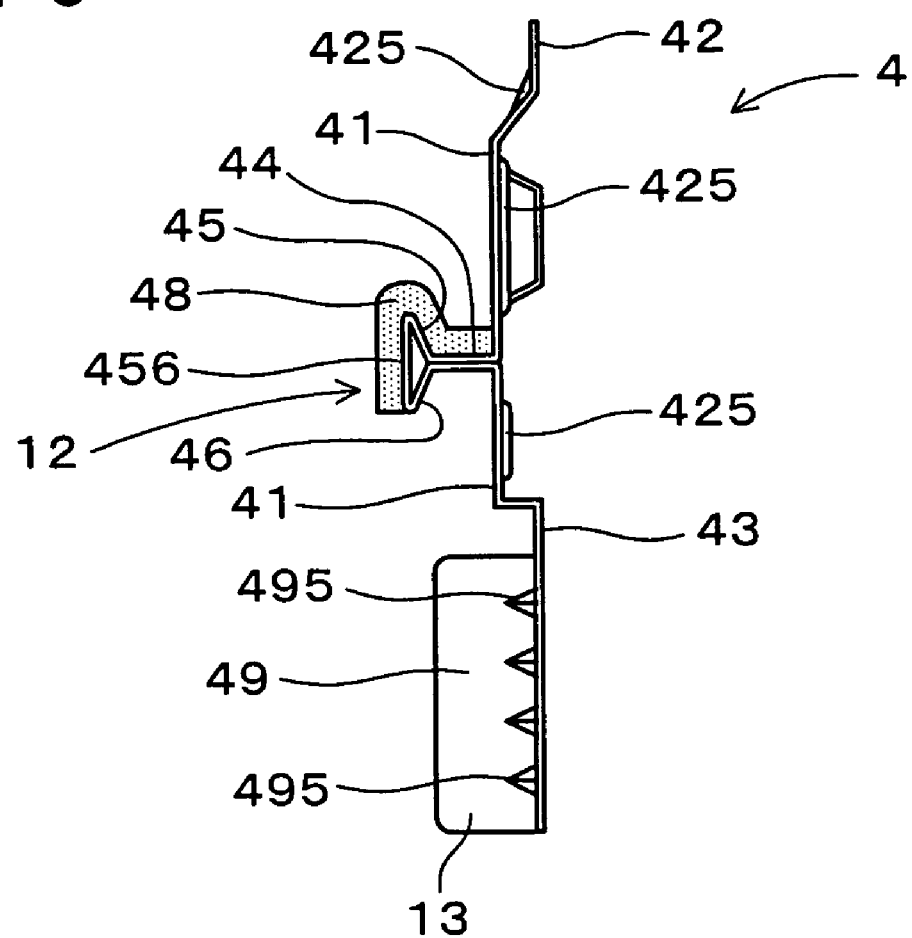
FIG. 6 is a right side elevational view of the fastening fitting with the stopper in accordance with the embodiment 1.

As shown in FIGS. 5 and 6, the fastening fitting with a stopper 4 has a base plate portion 41 which is abutted on a rear side surface 36 of the siding board 3. An upper foot portion 42 and a lower foot portion 43 which are respectively arranged in a front surface of the long fixing plate portion 11 in a contact manner are formed in an upper side and a lower side of the base plate portion 41. Further, the fastening fitting with a stopper 4 has a supporting portion 44 which is provided in a rising manner in a horizontal direction from the base plate portion 41 to a front side, an upper board engaging portion 45 which is bent obliquely to an upper side from the supporting portion 44, and a lower board engaging portion 46 which is bent obliquely to a lower side from the supporting portion 44.

Further, as shown in FIGS. 11 and 12, the fastening fitting with a stopper 4 is arranged in an upper end of the lateral joint portion 39 of the left and right siding boards 3, and is structured such that the fastening fitting with a stopper 4 can be engaged with the upper end portion 31 and the lower end portion 32 of the left and right siding board 3.

Further, as shown in FIGS. 5 and 6, the fastening fitting with a stopper 4 has the supporting portion 44 in right and left two positions, and has a connecting portion 456 connecting a front end of the upper board engaging portion 45 and a front end of the lower board engaging portion 46.

Further, the fastening fitting with a stopper 4 has a center horizontal rising portion 47 provided in a rising manner in a horizontal direction from the base plate portion 41 to a front side between the two supporting portions 44, and a center front plate portion 471 formed in a vertical direction in a front end of the center horizontal rising portion 47. The center front plate portion 471 is arranged in a rear side from the connecting portion 456. Further, two grooves of elastic members 48 are arranged from an upper surface of a lateral end portion of the center horizontal rising portion 47 over a front surface of the center front plate portion 471. Accordingly, since a rain water flows down along the front surface of the center front plate portion 471 positioned between the two grooves of elastic members 48, it is possible to more securely prevent the rain water from making a penetration into an inner portion of the siding boards attachment structure 6.

Further, as shown in FIGS. 5 and 6, the fastening fitting with a stopper 4 has a vertical rising portion 49 which is provided in a rising manner in a front side in a vertical direction, in a lower side from the supporting portion 44. The vertical rising portion 49 is bent approximately perpendicularly with respect to the lower foot portion 43, and a reinforcing rib 495 formed by locally deforming a metal plate is formed in a bent portion. Further, reinforcing ribs 415 and 425 are respectively formed in the base plate portion 41 and the upper foot portion 42.

In this case, the vertical rising portion 49 forms the vertical rising portion 13 in the fastening member 1.

Figure 7:
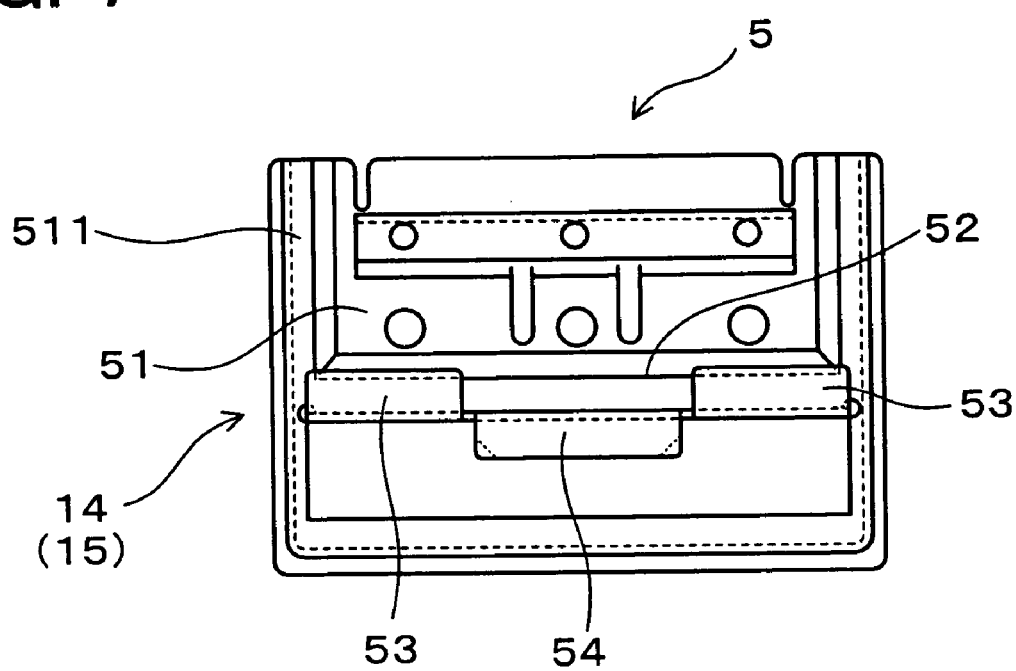
FIG. 7 is a front elevational view of a fastening fitting in accordance with the embodiment 1.
Figure 8:
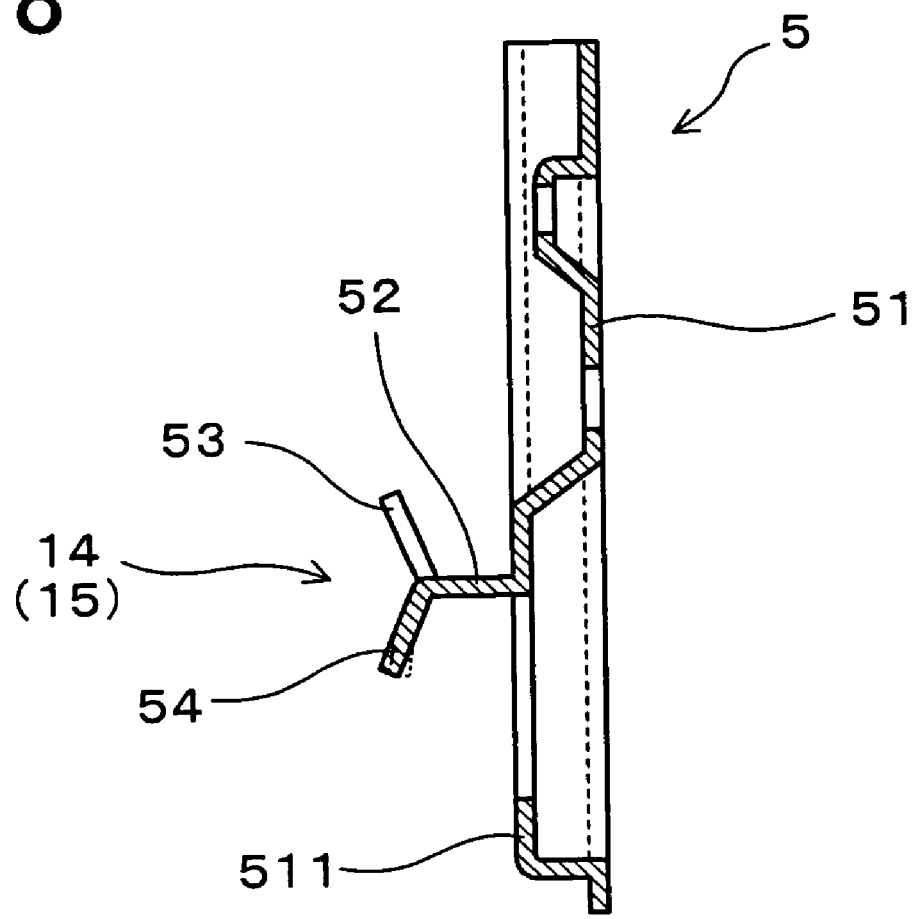
FIG. 8 is a cross sectional view of the fastening fitting forming the second fastening portion of the fastening member in accordance with the embodiment 1.

Further, as shown in FIGS. 7, 8 and 13, the fastening fitting 5 has a base plate portion 51 which is abutted on a front surface of the post or the stud (the vertical member 21), a supporting portion 52 provided in a rising manner in a front side from the base plate portion 51, an upper board engaging portion 53 bent obliquely to an upper side from the supporting portion 52, and a lower board engaging portion 54 bent obliquely to a lower side from the supporting portion 52.

Further, the fastening fitting 5 engages the upper end portion 31 of the siding board 3 arranged in the lower side by the lower board engaging portion 54, and supports the lower end portion 32 of the siding board 3 arranged in the upper side by the supporting portion 52 and engages the lower end portion 32 by the upper board engaging portion 53.

In other words, the lower board engaging portion 54 engages an upper underlying tongue portion 311 provided in the upper end portion 31 of the lower side siding board 3. Further, the supporting portion 52 supports a lower portion engagement portion 322 in a rear side of a lower overlying tongue portion 321 provided in the lower end portion 32 of the upper side siding board 3, and the upper board engaging portion 53 engages the lower portion engagement portion 322. Accordingly, the siding board 3 is fastened to the framework 2 via the long fixing plate portion 11.

Further, the upper and lower siding boards 3 are jointed in accordance with a shiplap joint in which the upper underlying tongue portion 311 and the lower overlying tongue portion 321 are overlapped.

Further, as shown in FIGS. 7 and 13, a continuous protruding portion 511 protruding to a front side is formed by drawing continuously along right and left sides and a lower side thereof, in the base plate portion 51. Further, as shown in FIG. 13, a rear side surface 36 of the siding board 3 is abuts on an upper surface portion of the continuous protruding portion 511.

Further, the framework 2 mentioned above is constituted by a wooden framework, and is structured such that a plurality of the vertical members 21 are arranged at a span of 610 mm.

Further, in the present embodiment, the fastening member 1 is directly fixed to the vertical member 21, however, may be indirectly fixed to the vertical member 21 via an underlayment such as a furring strip or the like.

Further, the fastening member 1 is made of a metal material such as a hot melted zinc-luminum-magnesium alloy coated steel plate, a stainless steel plate, or the like. In other words, each of the long fixing plate portion 11, the fastening fitting with a stopper 4 and the fastening fitting 5 are formed by cutting or bending the steel plate.

Further, the siding board 3 is constituted by a ceramic type siding board, and has a vertical shiplap joint structure in which the upper underlying tongue portion 311 is provided in the upper end portion 31, and the lower overlying tongue portion 321 is provided in the lower end portion 32, as shown in FIGS. 12 and 13.

Further, in the siding boards attachment structure 6 in accordance with the present embodiment, the siding board 3 is constructed in a breaking joint shape, for example, as shown in FIG. 10. In other words, the siding board 3 is constructed such that vertical joints formed by the lateral joint portion 39 are alternately arranged. In this case, the present invention is not limited to the breaking joint shape, but can correspond to various sticking methods of the siding board.

Next, a description is given of a method of attaching siding boards for constructing the siding boards attachment structure 6 in accordance with the present embodiment (refer to FIGS. 10 and 11).

First, the fastening member 1 having the long fixing plate portion 11 of a length (650 mm) equal to or more than an arrangement span (610 mm) of the vertical member 21 is prepared.

Further, the fastening member 1 is fixed to the framework 2, in the upper end portion 31 of the siding board 3 arranged in the lower side. A fixing method can employ a method of driving a nail into the vertical member 21 by using the nail hole 114 of the long fixing plate portion 11 arranged in the front surface of the vertical member 21 or a method of fixing by screw by using the screw hole 115 (not shown).

At this time, the vertical rising portion 13 abuts on the side end surface 33 of the siding board 3 arranged in the left side, in the lateral joint portion 39 of the siding board 3 arranged in the lower side, and the first fastening portion 12 is engaged to the upper end portion 31 of the siding board 3. Further, the second fastening portion 14 and the third fastening portion 15 are engaged to the upper end portion 31 of the siding board 3, in the other portions than the lateral joint portion 39.

Next, the upper siding board 3 is arranged in such a manner that the lower end portion 32 of the siding board 3 arranged in the upper side is supported and engaged to the first fastening portion 12, the second fastening portion 14 and the third fastening portion 15.

Further, the fastening fitting 5 having the same shape is independently arranged in the portion in which the fastening member 1 is not arranged, and in the portion in which the upper end portion 31 or the lower end portion 32 of the siding board 3 is arranged in the front surface of the vertical member 21, and the siding board is fastened.

The siding boards attachment structure shown in FIG. 10 is constructed by repeating the operation.

Next, a description is given of an operation and effect of the present embodiment.

The fastening member 1 mentioned above has the long fixing plate portion 11 fixed to at least one vertical member 21, is provided with the first fastening portion 12 in the left end portion of the long fixing plate portion 11, is provided with the vertical rising portion 13 in the lower side thereof, is provided with the second fastening portion 14 in the right end portion, and is provided with the third fastening portion 15 in the approximately center portion. Accordingly, it is possible to fix the long fixing plate portion 11 to the vertical member 21 in a state of abutting the vertical rising portion 13 on the right end portion (the side end surface 33) of the left side siding board 3, and arranging the first fastening portion 12 in the lateral joint portion 39 of the siding board 3.

Further, as shown in FIG. 10, even in the case that the lateral joint portion 39 is arranged in the portion in which the vertical member 21 is not arranged, it is possible to securely engage and support the siding boards 3 arranged in the upper and lower sides by the first fastening portion 12, the second fastening portion 14 and the third fastening portion 15, and it is possible to fix by nail or fix by screw by using the nail hole 114 or the screw hole 115 of the long fixing plate portion 11 positioned in the front surface portion of the vertical member 21. Accordingly, it is possible to fasten the siding board 3 to the framework 2 with a sufficient strength.

Further, when arranging the first fastening portion 12 in the lateral joint portion 39, it is possible to fix the long fixing plate portion 11 to any vertical members 21 regardless of the position of the lateral joint portion 39. Accordingly, it is easy to construct.

Further, the siding boards 3 arranged in the upper and lower sides are engaged by the respective engaging portions in the first fastening portion 12, the second fastening portion 14 and the third fastening portion 15, and a size in a horizontal direction thereof is short. Accordingly, since the long fixing plate portion 11 can achieve a suitable rigidity with respect to an external load, it is possible to obtain the fastening member 1 which is excellent in a durability.

Further, since the fastening member 1 is provided with the first fastening portion 12, the second fastening portion 14 and the third fastening portion 15 so as to be apart from each other, and the engaging portions thereof are positioned in the same horizontal level, it is possible to securely fix the siding board 3 to the vertical member 21 without inclining the fastening member 1.

Further, the fastening member 1 has the vertical rising portion 13. Accordingly, even in the case that the lateral joint portion 39 is arranged in the portion in which the vertical member 21 is not arranged, it is possible to fix the fastening member 1 to the framework 2 in a state in which the vertical rising portion 13 abuts on the side end surface 33 of the siding board 3. Accordingly, it is possible to securely prevent a displacement in a lateral direction of the siding board 3.

Further, since the fastening member 1 can be obtained by fixing the fastening fitting with a stopper 4 and the fastening fitting 5 which are independently prepared, to the long fixing plate portion 11 in accordance with the burring process, it is easy to manufacture. Further, in the case that the lateral joint portion 39 of the siding board 3 is arranged at the position of the vertical member 21, it is possible to firmly fasten the siding board 3 by independently fixing the fastening fitting with a stopper 4 to the framework 2.

Further, since the fastening member 1 can be obtained by fixing the fastening fitting 5 which is independently prepared, to the long fixing plate portion 11, it is easy to manufacture. Further, as shown in FIG. 10, the fastening fitting 5 can be fixed to the framework 2 independently in the portion in which the fastening member 1 is not arranged, it is possible to use the member in common and it is possible to reduce a cost of the member.

Further, since the long fixing plate portion 11 is structured by forming the rib portions 111 and 112 and the lower side bent portion 113, it is possible to secure the strength of the long fixing plate portion 11. Further, it is possible to easily position in the vertical direction for attaching the fastening fitting 5 to the long fixing plate portion 11, by abutting the lower end of the fastening fitting on the lower side bent portion 113.

Further, since the long fixing plate portion 11 has a lateral length of 650 mm, it is possible to securely fix the fastening member 1 to at least one vertical member 21, even in the framework 2 in which the arrangement span of the vertical member 21 is 610 mm (24 inch).

As mentioned above, in accordance with the present embodiment, it is possible to provide the fastening member which can fasten the siding board in which the lateral joint portion is arranged in the portion where the vertical member is not arranged, with a sufficient strength, can prevent the lateral displacement, and is excellent in the durability.

Embodiment 2

Figure 15:
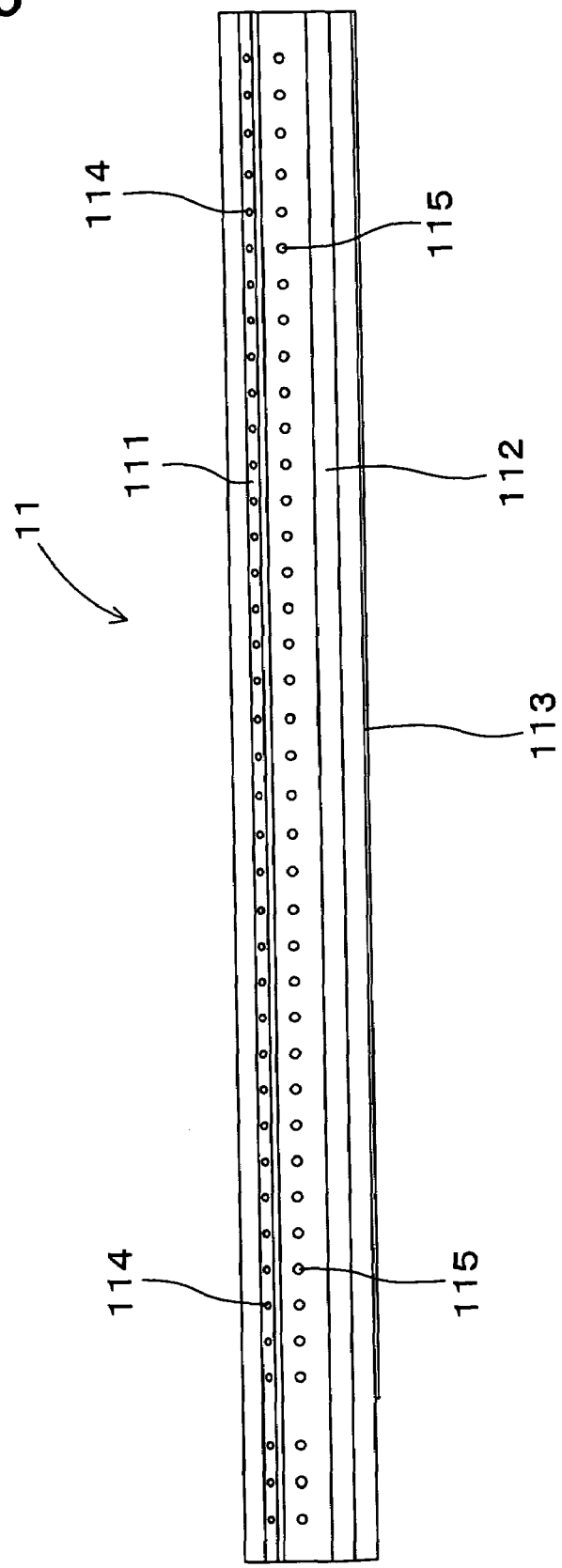
FIG. 15 is a front elevational view of a long fixing plate portion of the fastening member in accordance with the embodiment 2.
Figure 16:
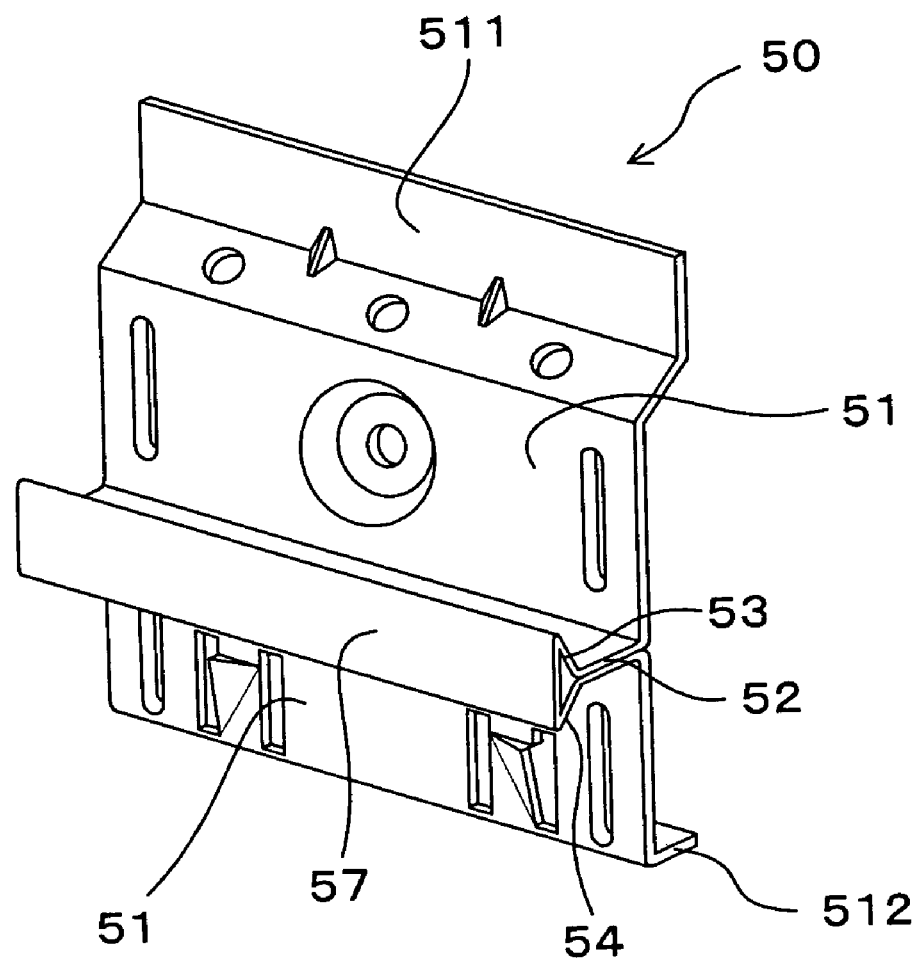
FIG. 16 is a perspective view of a fastening fitting forming the second fastening portion of the fastening member in accordance with an embodiment 2.

The present embodiment corresponds to an embodiment in which the second fastening portion 14 and the third fastening portion 15 are formed by using a fastening fitting 50 shown in FIG. 16 in place of the fastening fitting 5 in accordance with the embodiment 1, as shown in FIGS. 14 to 17.

Figure 17:
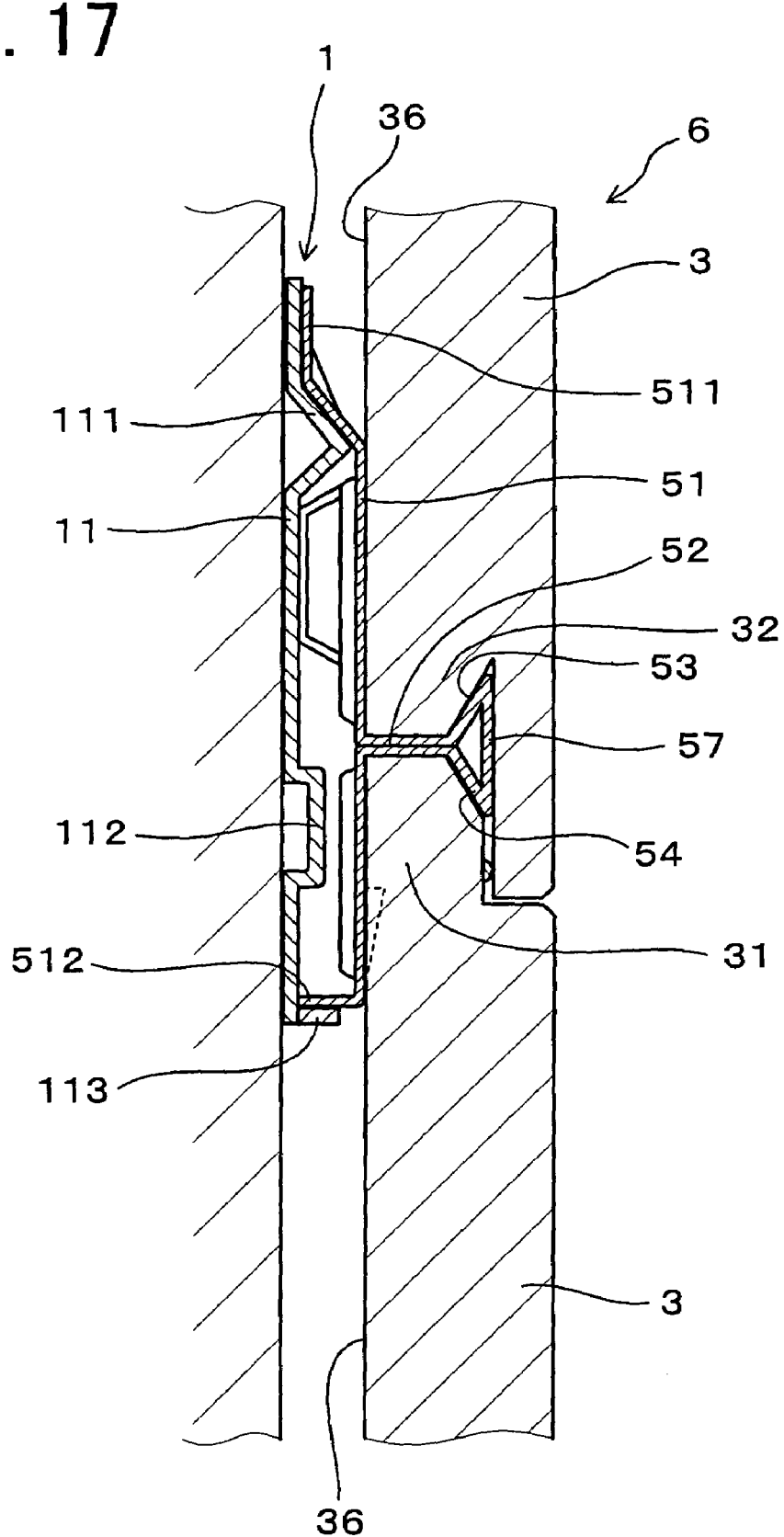
FIG. 17 is a cross sectional view of a siding boards attachment structure corresponding to a cross section as seen from an arrow along a line C-C in FIG. 14, in accordance with the embodiment 2.

The fastening fitting 50 has a base plate portion 51 which abuts on the rear side surface 36 of the siding board 3, a supporting portion 52 which is provided in a rising manner in a front side of the base plate portion 51, an upper board engaging portion 53 which is bent obliquely to an upper side from the supporting portion 52, and a lower board engaging portion 54 which is bent obliquely to a lower side from the supporting portion 52, as shown in FIGS. 16 and 17. Further, a front flat plate portion 57 is formed in a front side of the upper board engaging portion 53 and the lower board engaging portion 54. Further, the base plate portion 51 has an upper foot portion 511 and a lower foot portion 512 which abut on the long fixing plate portion 11 in an upper portion and a lower portion.

Further, as shown in FIG. 15, the long fixing plate portion 11 in the fastening member 1 in accordance with the present embodiment continuously forms rib portions 111 and 112 over an entire lateral length. Further, as shown in FIG. 17, the fastening fitting 50 is fixed to the long fixing plate portion 11 in a state in which the base plate portion 51 is astride both the rib portions 111 and 112 mentioned above.

The other structures are the same as those of embodiment 1.

In the case of the present embodiment, since it is sufficient to continuously form the rib portions 111 and 112 of the long fixing plate portion 11 as mentioned above, it is easy to manufacture the fastening member. Accordingly, it is possible to obtain a more inexpensive fastening member.

In addition, the present embodiment has the same operation and effect as those of the embodiment 1.

Embodiment 3

Figure 18:
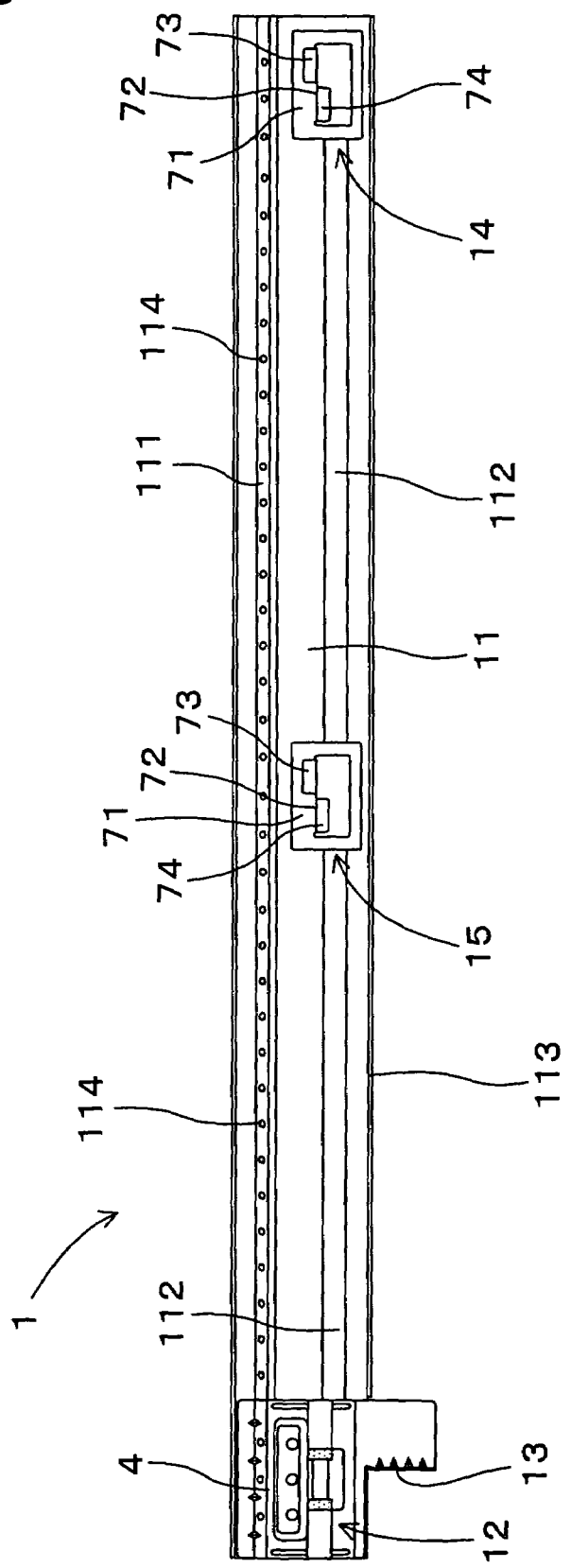
FIG. 18 is a front elevational view of a fastening member in accordance with an embodiment 3.
Figure 19:
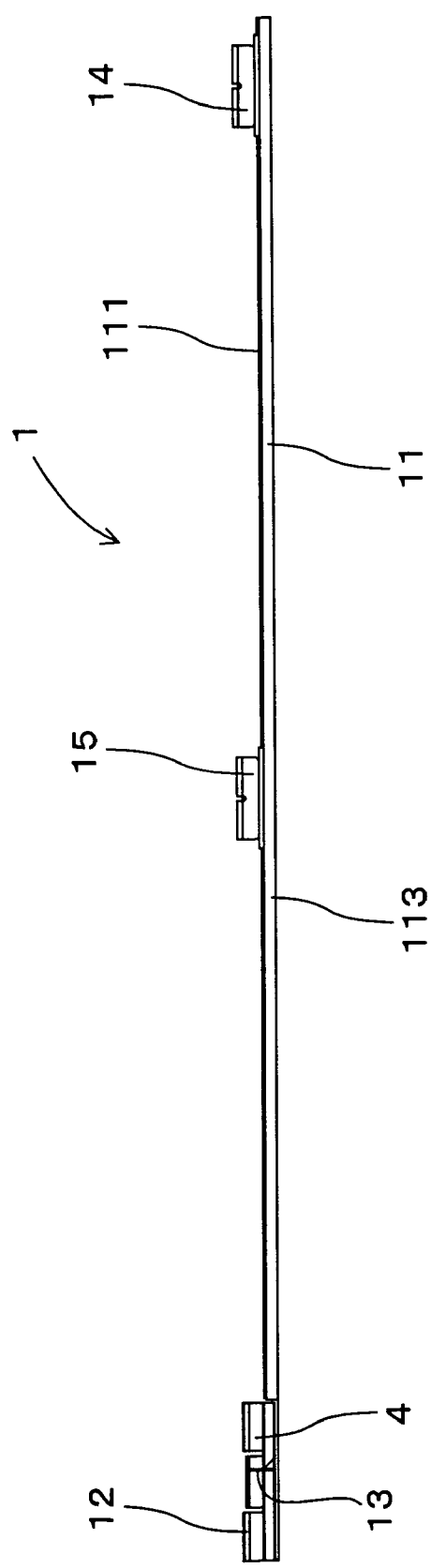
FIG. 19 is a base elevational view of the fastening member in accordance with the embodiment 3.
Figure 20:
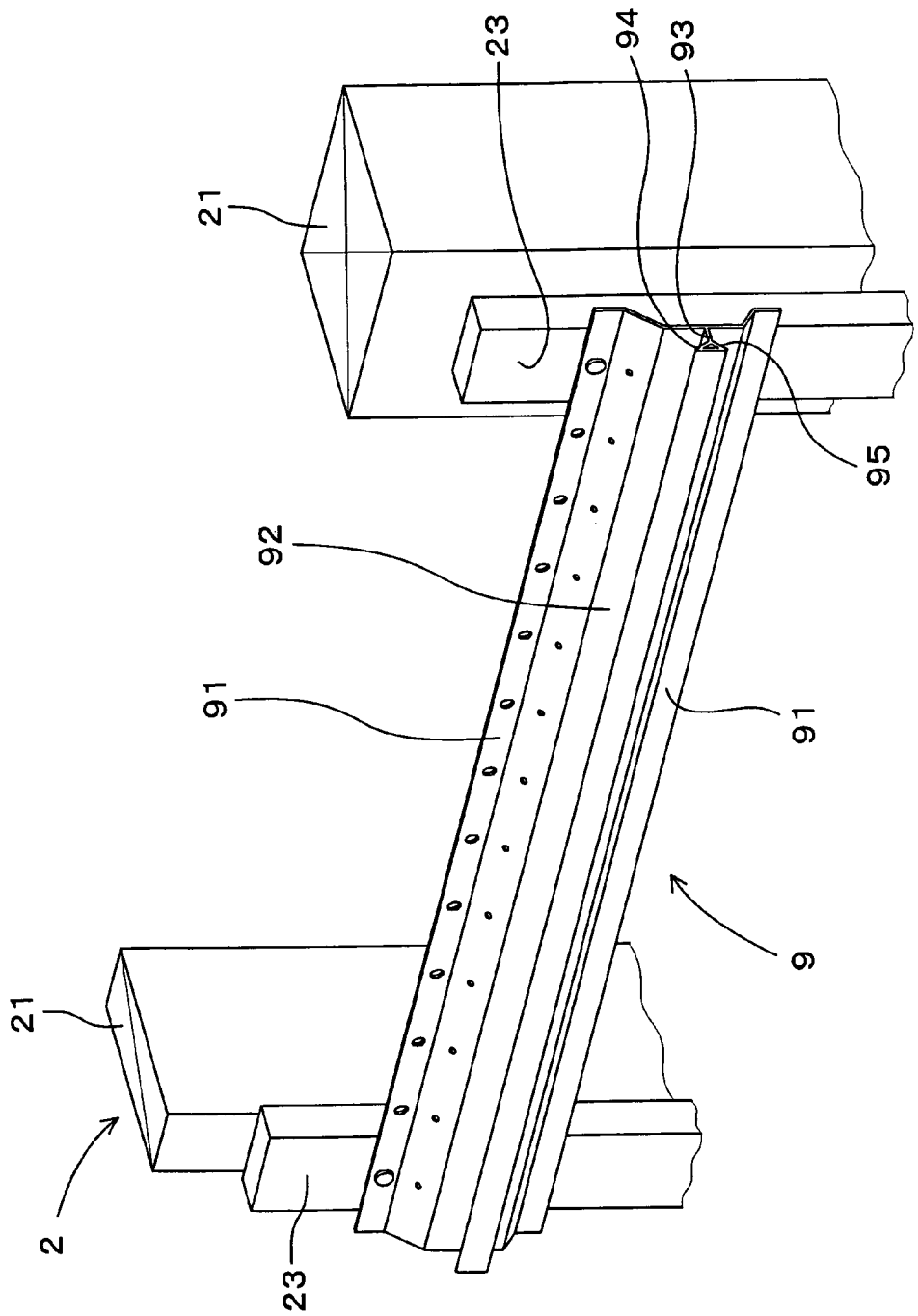
FIG. 20 is a perspective view of a long fastening fitting fixed to a vertical member, in accordance with a conventional example.

The present embodiment is an example of the fastening member 1 in which second fastening portion 14 and the third fastening portion 15 are integrally formed with the long fixing plate portion 11 by sheet metal processing a part of the long fixing plate portion 11, as shown in FIGS. 18 and 19.

In other words, a siding board contact surface 71 abutted on the rear side surface 36 of the siding board 3 is formed by partly pressing the right end portion and the center portion of the long fixing plate portion 11 so as to protrude to the front side. Further, a supporting portion 72 provided in a rising manner to a front side, an upper board engaging portion 73 bent obliquely to an upper side from the supporting portion 72, and a lower board engaging portion 74 bent obliquely to a lower side from the supporting portion 72 are formed by notching a part of the siding board contact surface 71 and applying a bending process.

The siding board contact surface 71 abuts on the rear side surface 36 of the siding board 3, the supporting portion 72 supports the lower end portion 32 of the siding board 3, the upper board engaging portion 73 engages the lower end portion 32 of the siding board 3, and the lower board engaging portion 74 engages the upper end portion 31 of the siding board 3.

A shape of the long fixing plate portion 11 is approximately equal to that of the embodiment 2, in the other portions than the second fastening portion 14 and the third fastening portion 15. However, the screw hole (refer to reference numeral 115 in FIG. 15) is not provided.

The other structures are the same as those of embodiment 1.

In the case of the present embodiment, since it is not necessary to fix the fastening fittings 5 and 50 which are independently prepared from the long fixing plate portion 11, in the long fixing plate portion 11, it is possible to achieve a weight saving of the fastening member 1 and a cost reduction.

In addition, the same operation and effect as those of the embodiment 1 are provided.

Obviously, numerous modifications and variations of the present invention are possible in light of the above teachings. It is therefore to be understood that, within the scope of the appended claims, the invention may be practiced otherwise than as specifically described here.

What is claimed is:

1. A fastening member for fastening a siding board to a framework of a building, comprising:
    a long fixing plate portion configured to be fixed to at least one of vertical members of the framework,
    a first fastening portion provided on a front surface of the long fixing plate portion for engaging an upper end portion in a lateral joint portion of the siding board and supporting and engaging a lower end portion of the siding board above the upper end portion,
    a vertical rising portion provided on the front surface of the long fixing plate portion configured to be arranged in the lateral joint portion in a lower side of the first fastening portion, and
    a second fastening portion provided on the front surface of the long fixing plate portion for engaging the upper end portion of the siding board in portions other than the lateral joint portion so as to support and engage the lower end portion of the siding board, wherein
    the lateral joint portion of the siding board is arranged in a portion where the at least one vertical members of the framework is not arranged in,
    the fastening member is formed by fixing a fastening fitting with a stopper to the front surface of the long fixing plate portion, and
    the fastening member with the stopper is formed by unifying the first fastening portion with the vertical rising portion.

2. The fastening member as claimed in claim 1, wherein the first fastening portion is provided in one end portion of the long fixing plate portion, and the second fastening portion is provided in an other end portion of the long fixing plate portion.

3. The fastening member as claimed in claim 1, further comprising: a third fastening portion having a same shape as a shape of the second fastening portion, wherein the third fastening portion engages the upper end portion of the siding board in portions other than the lateral joint portion so as to support and engage the lower end portion of the siding board.

4. The fastening member as claimed in claim 1, wherein the second fastening portion is integrally formed with the long fixing plate portion.

5. The fastening member as claimed in claim 1, wherein the long fixing plate portion comprises a rib portion protruding to a front side in a lateral direction, and a lower side bent portion bent to a front side from a lower side of the long fixing plate portion.

6. A siding boards attachment structure in which a lateral joint portion of the siding boards is arranged in a portion where a vertical member of a framework of a building is not arranged in, the siding boards attachment structure comprising:
    a plurality of fastening members, each comprising:
        a long fixing plate portion configured to be fixed to at least one of vertical members of the framework,
        a first fastening portion provided on a front surface of the long fixing plate portion for engaging an upper end portion in a lateral joint portion of the siding board and supporting and engaging a lower end portion of the siding board above the upper end portion, a vertical rising portion provided on the front surface of the long fixing plate portion configured to be arranged in the lateral joint portion in a lower side of the first fastening portion, and a second fastening portion provided on the front surface of the long fixing plate portion for engaging the upper end portion of the siding board in portions other than the lateral joint portion so as to support and engage the lower end portion of the siding board, wherein the fastening member is formed by fixing a fastening fitting with a stopper to the front surface of the long fixing plate portion, and the fastening member with the stopper is formed by unifying the first fastening portion with the vertical rising portion, wherein the siding boards are fastened to the framework by the plurality of fastening members, and the vertical rising portion abuts on a side end surface of the siding board in the lateral joint portion.

7. The siding boards attachment structure as claimed in claim 6, wherein the first fastening portion is provided in one end portion of the long fixing plate portion, and the second fastening portion is provided in an other end portion of the long fixing plate portion.

8. The siding boards attachment structure as claimed in claim 6, wherein the fastening member further comprises a third fastening portion having a same shape and a same function as those of the second fastening portion, wherein the third fastening portion engages the upper end portion of the siding board in portions other than the lateral joint portion, and supports and engages the lower end portion.

9. The siding boards attachment structure as claimed in claim 6, wherein the framework sets an arrangement span of the vertical member between 500 and 610 mm, and the long fixing plate portion has a lateral length between 540 and 650 mm.

10. A method of constructing a siding boards attachment structure in which a lateral joint portion of siding boards is arranged in a portion where a vertical member of a framework of a building is not arranged in, comprising:

preparing a fastening member having a long fixing plate portion of a length equal to or more than an arrangement span of the vertical members, a first fastening portion provided on a front surface of the long fixing plate portion for engaging an upper end portion in the lateral joint portion of the siding boards and supporting and engaging a lower end portion of the siding board above the upper end portion, a vertical rising portion provided on the front surface of the long fixing plate portion configured to be arranged in the lateral joint portion in a lower side of the first fastening portion, and a second fastening portion provided on the front surface of the long fixing plate portion for engaging the upper end portion of the siding board in the other portions than the lateral joint portion so as to support and engage the lower end portion of the siding board;

arranging and fixing the fastening member to the framework so as to abut the vertical rising portion on a side end surface of the siding board in the lateral joint portion of the siding boards arranged in a lower side, engage the first fastening portion to the upper end portion of the siding board, and engage the second fastening portion to the upper end portion of the siding board, in the other portions than the lateral joint portion; and next arranging the siding board in the upper side so as to support and engage the lower end portion of the siding board to the first fastening portion and the second fastening portion.

* * * * *